Oct. 29, 1957 E. SANDER 2,810,944
WATER AND GAS-TIGHT SLIDING CLASP FASTENER
Filed April 21, 1953 5 Sheets-Sheet 1

Inventor
ERNST SANDER
by Walter S. Pleston
ATTORNEY

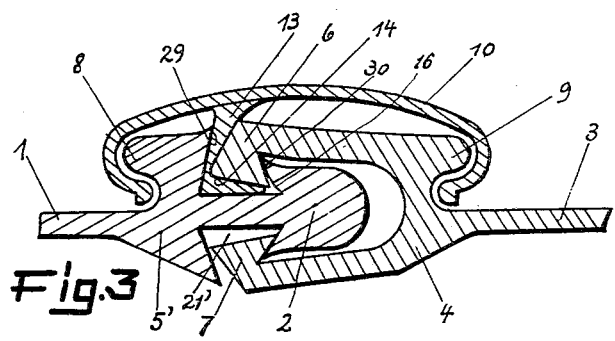
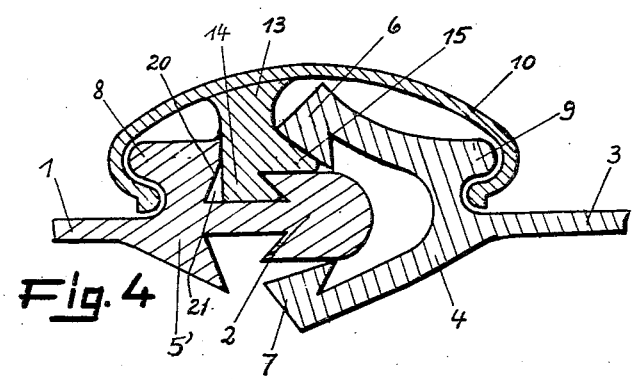
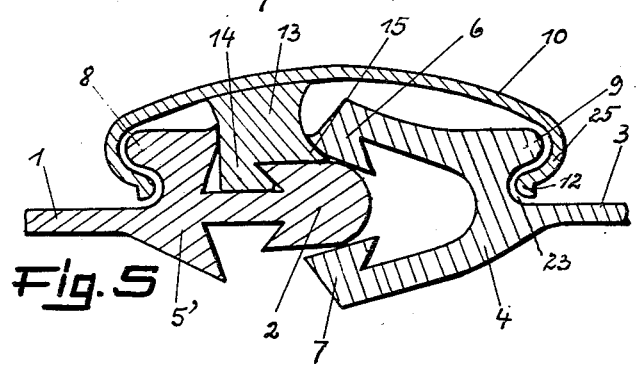

Oct. 29, 1957 E. SANDER 2,810,944
WATER AND GAS-TIGHT SLIDING CLASP FASTENER
Filed April 21, 1953 5 Sheets-Sheet 3

Inventor:
ERNST SANDER
by Walter S. Heston
ATTORNEY

Oct. 29, 1957            E. SANDER            2,810,944
WATER AND GAS-TIGHT SLIDING CLASP FASTENER
Filed April 21, 1953            5 Sheets-Sheet 4
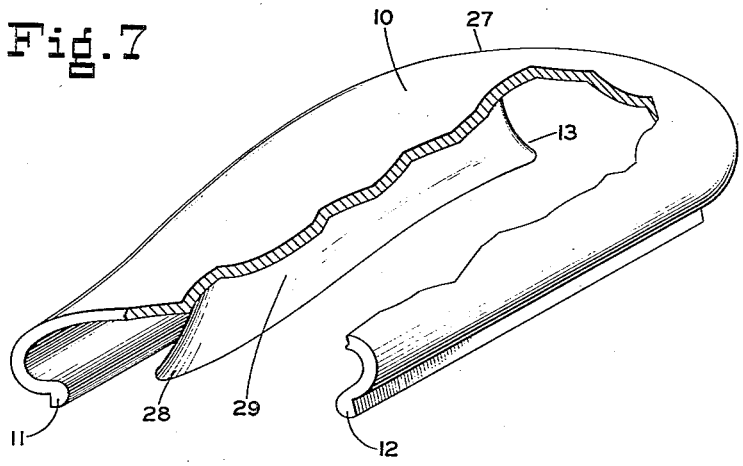
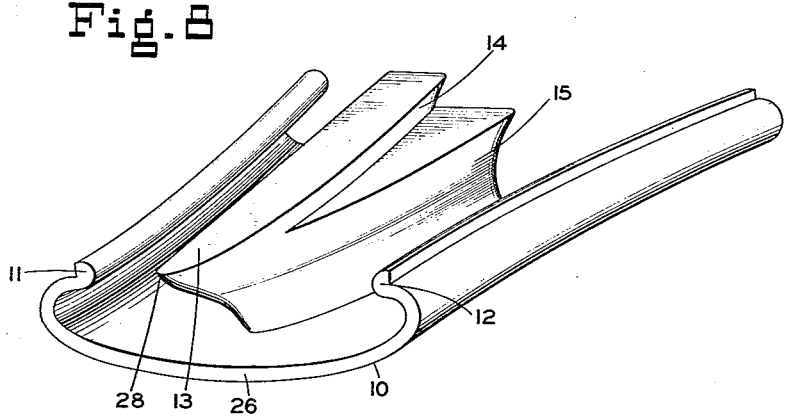
INVENTOR.
ERNST SANDER
ATTORNEY

United States Patent Office 2,810,944
Patented Oct. 29, 1957

2,810,944

WATER AND GAS-TIGHT SLIDING CLASP FASTENER

Ernst Sander, Milan, Italy, assignor to Giovanni Mastracchi-Manes, Milan, Italy

Application April 21, 1953, Serial No. 350,075

Claims priority, application Germany June 16, 1952

2 Claims. (Cl. 24—201)

The invention relates to a water and gas-tight sliding clasp fastener which comprises two elastic strips, the one provided with a head-shaped beading along one of its edges and the other one provided with a tongs-shaped beading along its adjacent edge, and wherein the beadings are in interlocking engagement when the fastener is closed.

The invention aims to provide a fastener of the mentioned type which is highly resistant to forces tending to open it, even if the fastener is applied to a container or the like, where it is subject to a gas or water-pressure from the interior of the container.

The invention further aims to provide a slider of novel design for the fastener which renders it possible to make the jaws of the tongs-shaped beading relatively short which contributes to the resistance of the fastener to the external forces tending to open it. Another object of the invention is the provision of a slider which is useful to accomplish the closing as well as the opening of the fastener.

The invention consists of a sliding clasp fastener comprising two elastic strips provided along their adjacent edges with beadings which can be interlocked so as to form a water and gas-tight closure and wherein a slider is instrumental to close and to open the fastener.

The invention further consists of a fastener of the mentioned type wherein the beading of the one strip is head-shaped and that of the other strip is tongs-shaped and the slider engages the beadings only on the upper sides of said strips.

Further objects and details of the invention will be apparent from the description given hereinafter and the accompanying drawing illustrating an embodiment thereof by way of example. In the drawing, Fig. 1 is a top plan view of a fastener according to the invention.

Fig. 3 is a section along line 3—3 of Fig. 1.

Fig. 4 is a section along line 4—4 of Fig. 1.

Fig. 5 is a section along line 5—5 of Fig. 1.

Fig. 7 is a perspective top view of the slider, a portion of which being broken away, Fig. 8 is a perspective bottom view thereof.

Figure 1:
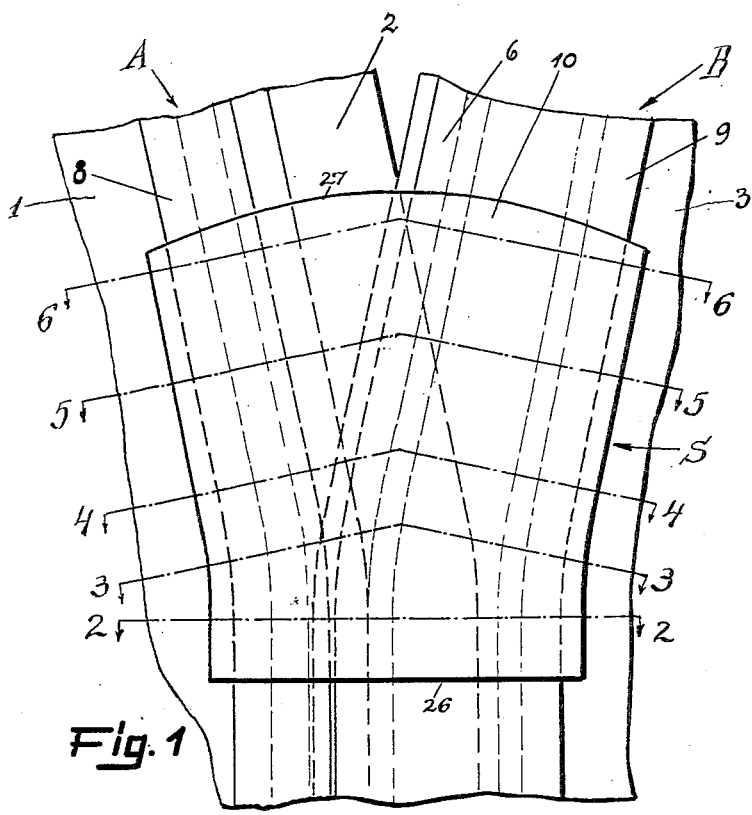

Referring now to the drawing the sliding clasp fastener comprises the strips A and B of elastic material and the rigid slider S. Strip A comprises the head-shaped beading 2 along an edge of the tape-like portion 1, and strip B comprises the tongs-shaped beading 4 along an edge of the tape-like portion 3. In addition the strip is provided with an upper rib 5 and a lower rib 5' at substantially equal distances from the head-beading 2. The adjacent faces 16 and 20 of the upper portion of the head-beading and of the rib 5 respectively are undercut and flank a groove 21. Similarly the undercut faces 16' of the lower head beading and 20' of the lower rib 5' flank the groove 21' and it will be noted that the ribs 5 and 5' project higher and lower, respectively, than the flanks 16 and 16' of the head beading 2. The tongs-like beading 4 comprises the jaws 6 and 7 which are so formed as to engage the grooves 21 and 21' respectively and to encompass the head beading 2 when engaging the grooves. Opposite to its flank 20 the upper rib 5 is provided with a ledge-forming projection 8 which forms a groove 22 with the tape-like portion 1. Similarly the upper part of the tongs-shaped beading is provided with a ledge-like projection 9 extending in the opposite direction to the ledge 8 and forming with the tape-like portion 3 a groove 23. It will be noticed that in the closed position of Fig. 2 the tape-like portions 1 and 3 are located in the same plane and that the configuration of the combined beadings is symmetrical with respect to a plane at right angles to the plane of the portions 1 and 3, and furthermore that the undercut faces of the beading on the upper side are symmetrical with respect to those on the lower side of the strips.

Figure 2:
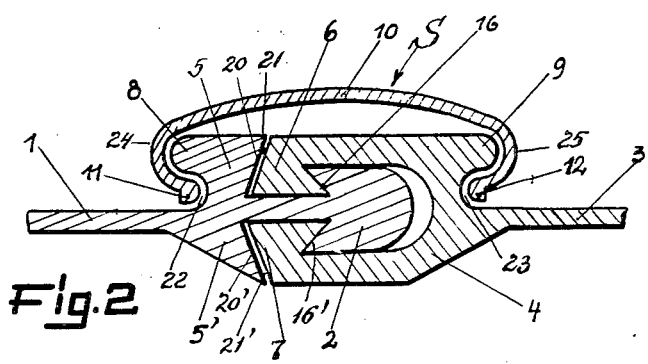
Fig. 2 is a section along line 2—2 of Fig. 1.

The illustrated structure is such that in the position of Fig. 2 the head beading and the tongs-beading are in interlocked engagement.

The slider S extends across the upper portions of the beadings and rib 5. It is substantially channel-shaped and comprises the upper web-like portion 10 and flange-like portions 24 and 25 which encompass the ledges 8 and 9 and engage with their free rounded edges 11 and 12 into the grooves 22 and 23 respectively. It will also be noted that there is a substantial free space in Fig. 2 between the arched web-like portion 10 of the slider and the flat top surface of the tongs-like beading. Into this space, as it will be described hereinafter, the jaw 6 can enter when the tongs-like beading is spread apart to open the fastener. Thus, the ledges 8 and 9 constitute a means to hold and guide the slider S on the upper side of the fastener strips. The channel cross-section of the slider is narrowest near its one end 26 which is the leading end upon movement of the slider in the direction to open the fastener as it will be explained hereinafter. The channel section becomes progressively wider towards the opposite slider end 27 where the strips A and B are separated from each other. Interiorly of the slider, an element 13 which serves for operating the fastener, projects downwards from the channel web 10. This element is so formed that upon movement of the slider in the direction to open the fastener, it enters wedge-like between both beadings and causes their separation and the disengagement of the tongs from the head beading. Upon the opposite movement of the slider to close the fastener, the element 13 cooperates with other portions of the slider to guide the beadings together and to cause their interlocking engagement. For this purpose the element 13 is substantially wedge-shaped, being widest near the aforementioned slider end 27. At the lower end of its front edge the wedge-shaped element 13 has a pointed extension 28 so formed as to engage in groove 21 of the strip A and to slide under the jaw 6 of the tongs 4 in order to remove that jaw from its interlocking engagement with the head beading. The shape of the inner slider configuration will be readily apparent from Figs. 7 and 8.

The wall of member 13 intended to engage the face 20 is so formed as to urge the upper edge of that face gradually in the direction of the ledge 8 when the slider is shifted to open the fastener. The other slide of member 13 is stepped and comprises two portions 14 and 15 both being slightly helically curved and constituting ways on which the jaw 6 is first urged out of the groove 21 by the portion 14, and then shifted off the head 2 by the portion 15 upon a continued movement of the slider S with its edge 26 leading.

Figure 9:
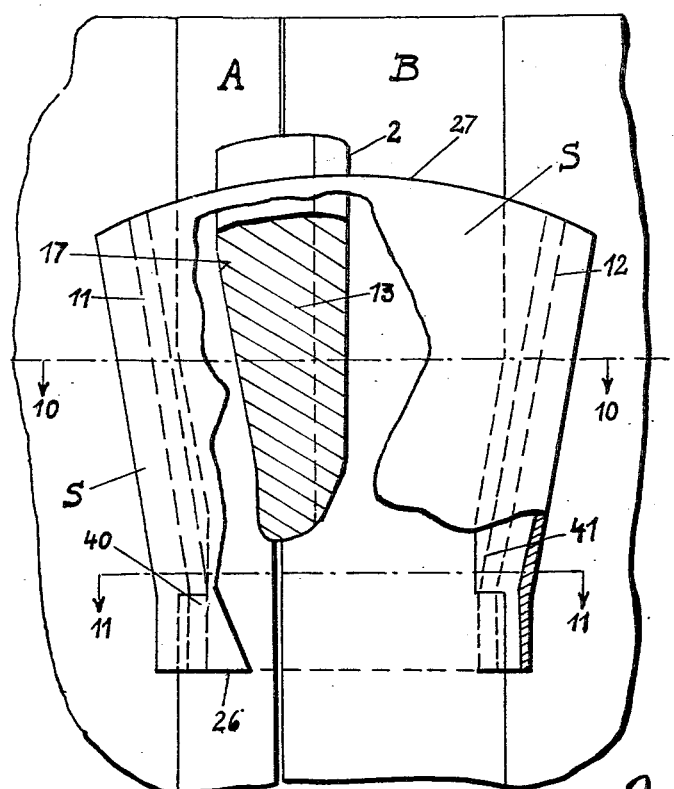
Fig. 9 is a top plan view of an end portion of the closed fastener, a portion of the slider being broken away.
Figure 10:
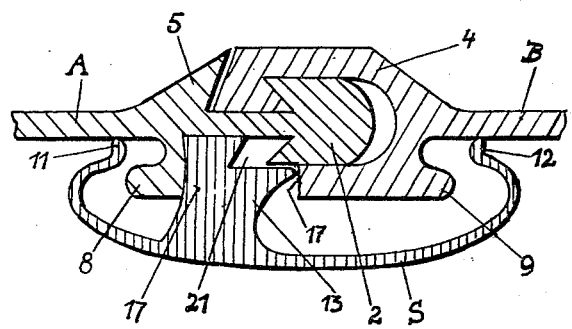
Fig. 10 is a section along line 10—10 of Fig. 9.
Figure 11:
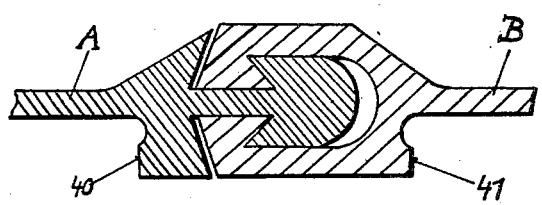
Fig. 11 is a section along line 11—11 of Fig. 9, the slider being removed.

Measures may be taken, to make the fastener tight at the location of the slider in its closing end position. For this purpose, the beadings may be provided with a recess 17 as shown in Figs. 9 and 10 and of a configuration substantially similar to the contour of the element 13 so that the latter can engage the recess. This recess need not be deeper than the groove 21 but may be somewhat longer than the element 13. At the location of the recess 17 the ledges 8 and 9 may be cut away as shown at 40 and 41 in Figs. 9 and 11, so that the slider may be lifted off the strips A and B. However, in order to facilitate the reapplication of the slider, the ends of the ledges 8 and 9 may somewhat overlap the extension of the recess 17.

The operation of the slider will be apparent from Figs. 2 to 6. Starting from the position of Fig. 1 the beadings 2 and 4 are interlocked at the cross-section 2 as shown in Fig. 2. Considering always the same cross-sectional portion of the beadings, and assuming that the slider is shifted with its edge 26 leading, then the point 28 of the element 13 will enter the groove 21 between the bottom face of the latter and the bottom face of the jaw 6. The helically rising portion 14 of the element will begin to lift the jaw 6 which will deform the edge 30 of the undercut face 16, and the face 29 of the element 13 will deform the upper edge of the face 20 so as to spread the groove flanks as shown in Fig. 3. Simultaneously the deformation and slight shift occurring in the upper portions of the beadings cause similar deformations in the lower portions owing to the elasticity of the material of the strips A and B, so that the lower jaw 7 also begins to detach itself from the clamping of the head beading.

Figure 6:
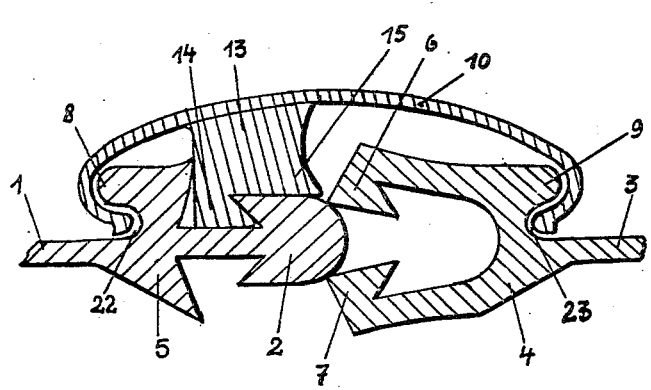
Fig. 6 is a section along line 6—6 of Fig. 1.

When the slider movement continues, the jaw 6 will be lifted free from the edge 30 of the head face 16 owing to the increasing thickness of portion 14, so that the portion 15 of element 13 can slide underneath the jaw 6 and push it back in the direction of its ledge 9. When this state illustrated in Fig. 4 is reached, jaw 7 is also disengaged from its groove 21' and rides on the lower face of the head beading 2. In the position of Fig. 5, the jaws 6 and 7 begin both to slide on the rounded front of the head 2. In Fig. 6, the jaw 6 has cleared the portion 15 and both jaws are almost ready to get separated from the head beading 2.

When the slider is shifted in the opposite direction to close the fastener, the interior taper of the slider by engaging the ledges 8 and 9 will urge the beadings together so that the jaws 6 and 7 sliding on the rounded face of the head 2 are spread apart (Fig. 6) until the jaw 6 can climb the face of the portion 15 whereas jaw 7 bears on the lower face portion of the head 2 (Fig. 4). When the slider movement continues, portion 14 will receive the jaw 6 whereas jaw 7 pressing against the undercut face of the rib 5' which extends farther downward than the head 2, will deform the latter so that the jaw 7 can enter the groove 21' (Fig. 3). The operation is finished when the beadings are interlocked as in Fig. 2. At the very end of its closing movement the slider is in the position of Fig. 9 where the element 13 engages the recess 17.

It will be apparent to those skilled in the art that many alterations and modifications of the structure hereinbefore described are possible without departure of the essence and spirit of the invention which for that reason shall not be limited but by the scope of the appended claims.

I claim:

1. A sliding clasp fastener comprising two strips of elastic material including each a tape-like portion and a beading along one edge of said tape-like portion, the beading of the first one of said strips being head-shaped, said first strip further including an upper rib and a lower rib parallel to the beading of said first strip so that said beading and said ribs form an upper and a lower groove, both of said grooves having undercut flanks, said beading of the second strip being tongs-shaped and the jaws of said tongs being so formed as to embrace said head-shaped beading and to fit into said grooves, respectively, thereby to interlock with said head beading and said ribs, said upper rib and said upper jaw each including a guide ledge, said ledges projecting in opposite directions, and a substantially channel-shaped slider extending across said beadings and said rib on the upper side of said strips and engaging said ledges laterally and underneath thereof with the flanges of said channel, said slider including an element projecting from the web of said channel intermediate said flanges, said element engaging in said upper groove between said upper rib and said upper jaw and being so formed as to cause interengagement or disengagement of said beadings depending on the direction of the slider movement, said element being substantially wedge-shaped in the longitudinal direction of the slider, the one side of said element being so formed as to bear against the groove flank on the side of said upper rib and the other side being so formed as to engage said upper jaw and to lift it out of said upper groove when the slider is moved in the direction to open the fastener, said other side of said element being stepped and said steps being slightly helically formed whereby the first step being instrumental to lift said upper jaw out of said upper groove and said second step being instrumental to shift said jaw off said head beading.

2. A fastener as claimed in claim 1, said element including a substantially sharp projection at its wedging edge with which to enter into said upper groove underneath said upper jaw, and said second step starting at a distance from said wedging edge.

References Cited in the file of this patent

UNITED STATES PATENTS

| | | |
|---|---|---|
| 833,501 | Baumgartner | Oct. 16, 1906 |
| 1,959,319 | Sipe | May 15, 1934 |
| 2,035,028 | Temple | Mar. 24, 1936 |
| 2,496,878 | Krupp | Feb. 7, 1950 |
| 2,581,604 | Roehrl | Jan. 8, 1952 |
| 2,606,351 | Wende | Aug. 12, 1952 |
| 2,641,037 | Gossner | June 9, 1953 |

FOREIGN PATENTS

| | | |
|---|---|---|
| 497,743 | Belgium | Dec. 16, 1950 |